June 26, 1945.  B. L. LEEDS  2,378,937
SIGHTING INSTRUMENT
Filed April 19, 1943   2 Sheets-Sheet 1

INVENTOR
BENJAMIN L. LEEDS
BY Herbert H. Thompson
his ATTORNEY.

INVENTOR
BENJAMIN L. LEEDS
BY
ATTORNEY.

Patented June 26, 1945

2,378,937

UNITED STATES PATENT OFFICE 2,378,937

SIGHTING INSTRUMENT

Benjamin L. Leeds, North Pelham, N. Y., assignor to Sperry Gyroscope Company, Inc., Brooklyn, N. Y., a corporation of New York Application April 19, 1943, Serial No. 483,681

10 Claims. (Cl. 88—1)

This invention relates to sighting instruments wherein a plurality of sighting members are utilized to follow an object and a single eye piece is associated with these sighting members. The invention particularly concerns an improved mechanism for shifting the optical path of the instrument between the eye piece and the respective sighting members.

Sighting instruments of this type are particularly useful in aircraft gun sights wherein separate optical systems are provided for sighting objects above and below the aircraft. In order that one observer may follow objects with these sights provision is made for selectively connecting the optics of a single eye piece to upper and lower sights. An example of these aircraft sights may be found in copending application Serial No. 411,186, for "Inter-aircraft gun sight and computer," filed December 17, 1941, in the names of C. G. Holschuh et al.

As explained in the copending application, an observer at a single eye piece adjusts the optics of upper and lower periscopes to follow movements of objects above and below the aircraft respectively. While the operator is thus tracking an object, an automatic mechanism is operated in accordance with predetermined movements of the optics to shift the optical path from the eye piece between the two periscopes as the object moves between their respective fields of view.

The automatic shifting or "flip over" mechanism described in the above-mentioned copending application is dependent for its action upon a toggle mechanism including a spring for rapidly actuating the shifting mechanism in accordance with predetermined movements of the tracking apparatus. Numerous difficulties arise from the use of resiliently connected mechanisms. The present invention avoids many of these disadvantages of the toggle spring mechanism.

The toggle-spring mechanism continuously accelerates the optical member which it controls till a stop is reached, which results in a substantial impact with the stop and causing a rebound movement of the optical member. The use of the spring-toggle mechanism has further disadvantages in that it is difficult to adjust and to maintain in correct adjustment for operating at the desired instant. It is also subject to dislocation due to vibrations of the aircraft on which the sight is mounted. In addition, the entire shifting mechanism of the above-mentioned copending application is operated by the tracking apparatus and is dependent thereon for the torque necessary to effect the shifting operation.

One object of the present invention is to provide a sighting instrument having an automatic mechanism for positively shifting the optical path between a plurality of sighting members and an eye piece.

Another object of the invention is to provide a sighting instrument having an automatic mechanism for positively shifting and locking a deflector to transfer the optical paths between a plurality of sighting members and a single eye piece.

A further object of the invention is to provide a sighting instrument having an automatic shifting mechanism in which the shifted member is decelerated as its desired position is reached.

A still further object of the invention is to provide a sighting instrument having an automatic shifting mechanism including driving means that is controlled by the tracking apparatus but does not require appreciable torque therefrom.

Further objects and advantages of the invention will become apparent from the following specification taken in connection with the accompanying drawings wherein, Fig. 1 is a schematic perspective view of a sighting instrument embodying the invention.

Figure 1:
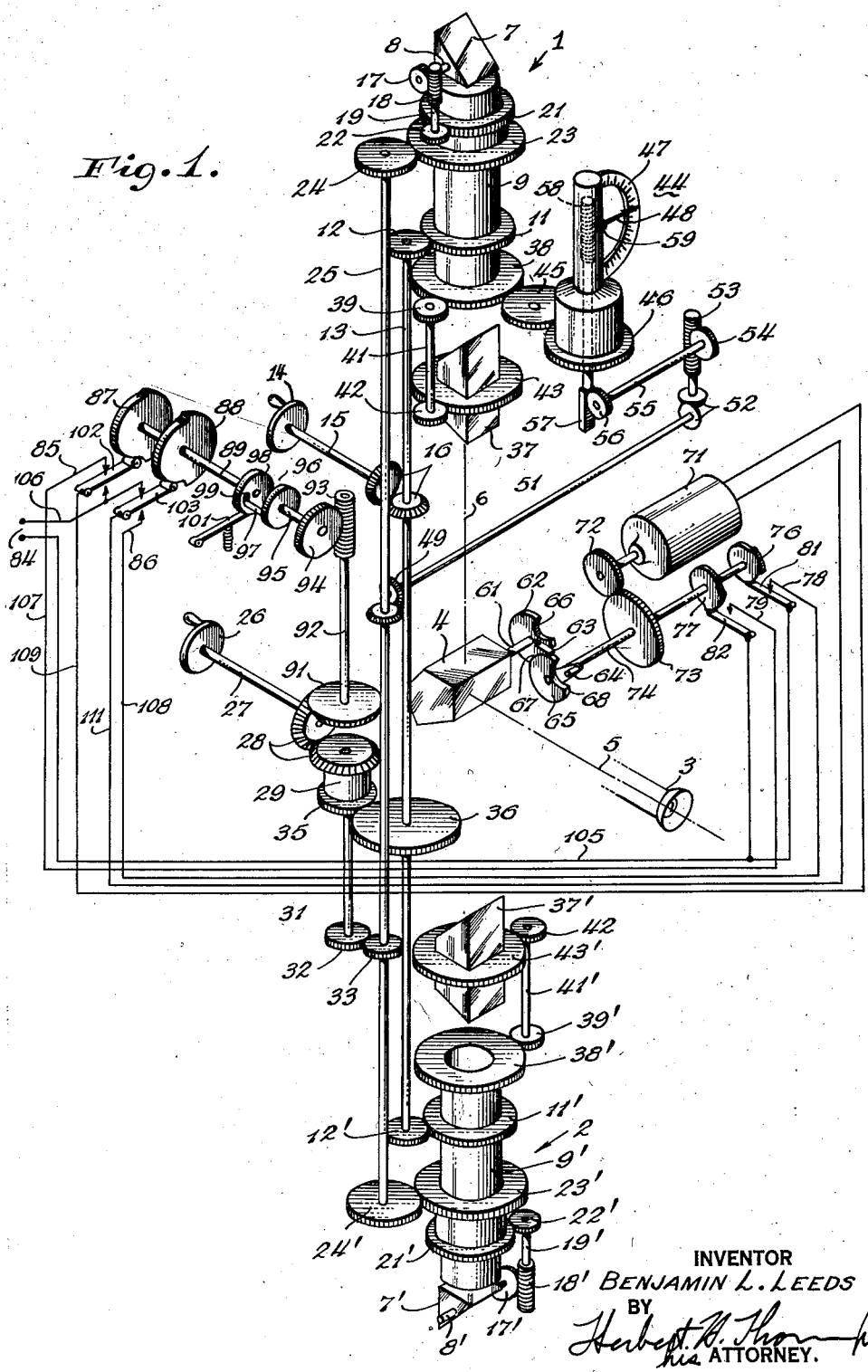

The sighting instrument shown in Fig. 1 is composed of a pair of sighting members in the form of periscopes designated generally at 1 and 2 and a single eye piece 3 adapted for use with either of the periscopes. The optical path between the periscopes 1 and 2 and the eye piece 3 is completed by a light-deflecting member in the form of a pentaprism 4 that may be rotated to shift the optical path from one of the periscopes to another depending upon the position of the object which it is desired to observe.

As shown in Fig. 1 the pentaprism completes an optical path designated by the lines 5 and 6 from the eye piece 3 to the periscope 1. By rotating the pentaprism 4 clockwise through an angle of 90°, the optical path between the sighting member or periscope 2 and the eye piece 3 is completed and the optical path to the sighting member 1 is disrupted.

Sighting member 1 includes a tracking reflecting prism 7 that is rotatable about the horizontal axis of shaft 8 and about the vertical axis of a main supporting body 9 to follow the movements of an object in elevation and azimuth, respectively.

The main body 9 has a gear 11 mounted thereon and in mesh with a pinion 12 on a shaft 13 that is suitably driven as by handwheel 14. The handwheel 14 acts through azimuth tracking mechanism including shaft 15 and gearing 16 to rotate the main body 9 and the prism 7 in azimuth. As an object being observed through the eye piece 3 moves in azimuth the operator actuates the azimuth tracking mechanism by rotating handwheel 14 to cause the prism 7 to follow movements of the object and thus maintain the object within the field of view of the prism.

Shaft 8 carries a worm gear 17 that is driven by a worm 18 on shaft 19 to rotate the prism 7 about a vertical axis for following elevation movements of an object. The elevation tracking mechanism for operating shaft 19 includes gear 21 that meshes with the gear 22 on shaft 19. A gear 23 integral with the gear 21 and rotatable therewith about the main body 9 is driven by a pinion 24 on shaft 25. This mechanism is actuated by a handwheel 26 that drives shaft 27 and gearing 28 forming one input of a compensating differential 29, the output of which drives through shaft 31 and gears 32, 33 to rotate the shaft 25.

The operator observing an object through the eye piece 3 rotates the handwheel 26 to drive the elevation tracking system for rotating the prism 7 about the horizontal axis of shaft 8 thereby following elevation movements of an object. The gear 21 is rotatable independently of the main body 9, azimuth movements of the prism 7 and main body 9 about a vertical axis cause the gear 22 to rotate relative to the gear 21 thereby causing an elevation movement of the prism 7. In order to prevent such azimuth movements from affecting corresponding elevation movements, input gear 35 of the compensating differential 29 is rotated by a pinion 36 on the shaft 13 in accordance with the azimuth movements of the prism 7. It will be apparent therefore that the gear 21 is rotated by the output shaft 31 of the compensating differential 29 in accordance with movements of the main body 9 about a vertical axis.

In order to provide an erect image for the observer at the eye piece 3 a dove prism 37 is inserted in the optical path between the prism 7 and the eye piece 3. As the prism 7 is rotated in azimuth the angular displacement of the dove prism 37 should be one half the angular displacement of the sighting prism 7. This is accomplished by rotating gear 38 with the main body 9 to drive through a gear 39, shaft 41 and pinion 42 to rotate a gear 43 surrounding the prism 37 at one half rotation of the main body 9.

In order to provide an indication of the approximate direction of the field of view for the prism 7, an indicator 44 is adjusted in elevation and azimuth in accordance with the movements of the prism 7. The azimuth direction of the prism 7 is transmitted to indicator 44 by driving an idled gear 45 from the gear 38 and thereby rotating a gear 46 in mesh with the gear 45. Any directional indicator may be provided such as the semi-circular scale 47 which is rotated in accordance with the rotation of prism 7 about the vertical axis. Thus the direction of the scale 47 indicates the azimuth direction of the field of view for the prism 7.

A pointer 48 carried by the indicator 44 moves over the scale 47 in accordance with elevation movements of the prism 7. These elevation movements are transmitted from the shaft 25 through suitable gearing 49, shaft 51 and gearing 52 to rotate a worm 53 that drives a worm gear 54 on a shaft 55. Shaft 55 rotates a pinion 56 in mesh with a cylindrical rack 57 that translates a similar rack 58 to rotate a pinion 59 on which the pointer 48 is mounted.

The lower sighting member of periscope 2 has a prism 7' that is rotatable about the vertical axis of a shaft 8' by a worm gear 17' driven by worm 18' to follow elevation movements of an object. The worm 18' is driven from the shaft 25 through elevation tracking mechanism including a pinion 24', gear 23' to rotate a gear 21'. The gear 21' drives through gear 22' to rotate shaft 19' on which the worm gear 18' is mounted.

The azimuth tracking mechanism for rotating the main body 9' of the periscope 2 about a vertical axis includes a pinion 12' on the shaft 13, which rotates a gear 11' that is supported on the main body 9'. A dove prism 37' is rotated about a vertical axis at double the angular displacement of the prism 7' by a pinion 38' on the main body 9' and acts through to gear 39', shaft 41' and pinion 42' to rotate a gear 43' that is supported on the prism 37'.

With the mechanism thus far described it is possible for the operator to observe an object through the eye piece 3 and rotate handwheels 14 and 26 to control the azimuth and elevation tracking mechanism for causing the sighting members 1 and 2 to follow movements of an object. It will be apparent that the two sighting members are constantly directed along the same line of sight. However, since the periscopes usually project from the opposite sides of a fuselage of a plane, the fuselage obstructs the view from one of the members. Therefore, provision is made to select the particular sighting member to be used depending upon the position of the object toward which it is desired to observe.

As previously explained, the pentaprism 4 is adapted to be shifted to selectively complete the optical path between the eye piece 3 and the periscope 1 or the periscope 2. The subject matter of the present invention concerns the improved sighting instrument that is provided by the new mechanism for shifting the pentaprism 4.

Although the shiftable member shown in the drawing is a pentaprism, it should be understood that any light-deflecting member such as a mirror, prism or lens may be used to selectively complete the optical path between the two sighting members and the eye piece.

As shown in Fig. 1 the pentaprism 4 is rotatable about the axis of a shaft 61 by a Geneva mechanism which includes a slot gear 62 having a slot 63 formed therein and adapted to receive a pin 64 on pin gear 65. The pin gear 65 and slot gear 62 are so arranged that a single rotation of the pin gear 65 causes the pin 64 to engage in slot 63 and rotate the slot gear 62 exactly 90°. Thus the position of the pentaprism may be shifted from the position shown in Fig. 1 to a position angularly displaced by 90° whereby the optical path from the eye piece 3 to the persicope 2 would be completed.

Figure 2:
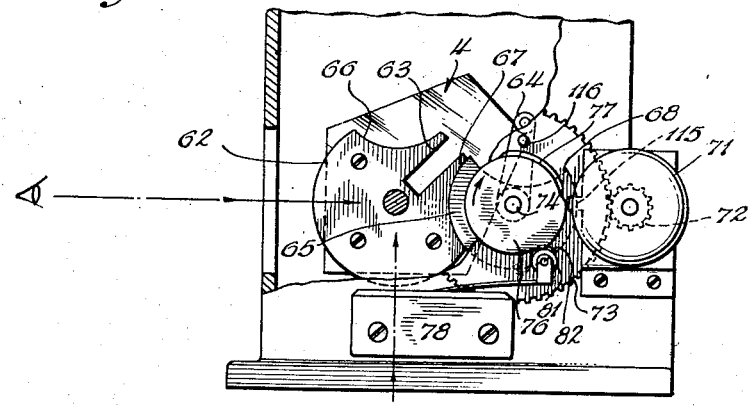
Fig. 2 is an elevation view of an improved shifting mechanism embodying the invention having some parts in section and others broken away for purposes of clearness.
Figure 3:
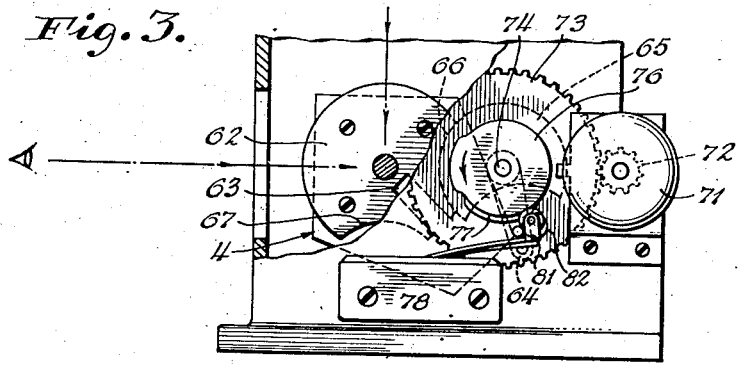
Fig. 3 is a view similar to Fig. 2 but showing elements of the shifting mechanism in different positions.
Figure 4:
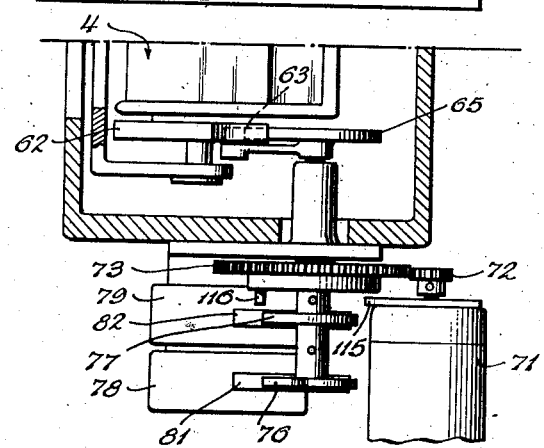
Fig. 4 is a horizontal sectional view of the mechanism shown in Figs. 2 and 3.

Figs. 2 and 3 show different positions of the Geneva mechanism for the two positions of the pentaprism 4. In Fig. 2 pentaprism 4 is arranged to complete the optical path between the lower sighting member 2 and the eye piece 3, whereas in Fig. 3 the pentaprism is arranged to complete the optical path between the upper sighting member 1 and the eye piece 3.

The slot gear 62 is formed with a pair of circular notches 66, 67 in its periphery adapted to receive the pin gear 65 upon disengagement of pin 64 from slot 63 whereby the slot gear 62 is locked against further movement. A circular notch 68 formed in the periphery of the pin gear 65 releases the notches 66 and 67 of the slot gear 62 as the pin 64 enters the slot 63.

As shown in Fig. 2 the Geneva mechanism has just completed a cycle of operation in moving the slot gear in a counterclockwise direction through an angle of exactly 90°. The slot gear 62 is locked against further rotation by engagement of the pin gear 65 in the circular notch 67.

As shown in Fig. 3 the Geneva mechanism has just completed its action in shifting the pentaprism from the position shown in Fig. 2 to the position shown in Figs. 1 and 3 whereby the upper periscope is operatively associated with the eye piece 3. Pin gear 65 is engaged in the circular notch 66 thereby locking the slot gear 62 and light-deflecting member 4 against further movement.

Suitable driving means such as motor 71 is arranged to drive through pinion 72 to rotate gear 73 and shaft 74 on which the pin gear 65 is mounted. Also mounted on the shaft 74 are a pair of disc cams 76 and 77 adapted to control limit switches 78 and 79 by means of followers 81 and 82. The limit switches 78 and 79 are arranged in a circuit of the motor 71 to deenergize the motor immediately upon completion of a movement of the pentaprism 4 by the pin and Geneva gear mechanism.

As may be seen Fig. 2 the cam 76 is arranged to open the switch 78 after the pin gear 65 enters the circular notch 67 to assure locking the pentaprism in position upon completing rotation of the slot gear 62 in a counter-clockwise direction. Similarly, as shown in Fig. 3 the cam 77 moves follower 82 to open the limit switch 79 after the pin gear 65 enters the circular notch 66 upon completing rotation of the slot gear 62 and pentaprism 4 in a clockwise direction.

Referring again to Fig. 1, it may be seen that the motor 71 is energized from a suitable source 84. The supply of energy from the source 84 to the motor 79 is controlled by a pair of reversing switches 85 and 86 arranged to control the direction of rotation of the motor 71 in accordance with the elevation position of the sighting members in a manner to be described. In addition to the reversing switches, the limit switches 78 and 79 also control the application of energy to the motor 71 as has already been described.

The reversing switches 75 and 86 are controlled by disc cams 87 and 88 mounted on a shaft 89 that is rotated in accordance with the elevation position of the prisms 7 and 7'. Rotation of the handwheel 26 acts through the shaft 27 and gear 28 to drive a gear 91 on shaft 92 which rotates a worm 93 to drive worm gear 94 on a shaft 95. A lost motion device such as the loose coupling 96 is utilized to drive the shaft 89 from the shaft 95 for a reason that will subsequently become apparent.

The loose coupling device 96 includes a pin 97 mounted on the shaft 95 and a disc 98 having a circular slot 99 formed therein and adapted to receive the pin 97. When the direction of rotation of the shaft 95 is reversed, the shaft 89 remains stationary during the interval required for the pin 97 to travel along the slot 99 before reversing the direction of rotation of the disc 98. A suitable brake 101 is provided to prevent undesired rotation of the disc 98.

The reversing switches 85 and 86 include followers 102 and 103 riding on cams 87 and 88 for alternately closing the upper and lower contacts of the switches. One side of the source 84 is connected directly by lead 105 to the followers 81 and 82 of the limit switches 78 and 79. The other side of the source 84 is connected by lead 106 to the lower contact of reversing switch 85 and the upper contact of reversing switch 86. The upper contact of the reversing switch 85 is connected by lead 107 to the limit switch 79. The lower contact of the reversing switch 86 is connected by lead 108 to the limit switch 78. The followers 102 and 103 forming the center contacts of the reversing switches 85 and 86 are connected by leads 109 and 111, respectively, to the motor 71.

As shown in Fig. 1, the followers 102 and 103 are riding on the lower portions of the cams 87 and 88 whereby the upper contacts of the switches 85 and 86 are closed. The switches in this position connect one side of the source 84 to the motor 71 through lead 111. The other motor lead 109 is connected to limit switch 79. However, the follower 82 is on the raised portion of the cam 77 so that the limit switch 79 is in its open position. If the handwheel 26 is now rotated to cause the prisms 7 and 7' to move through the line dividing their respective fields of view, that is the zero elevation position, the followers 102 and 103 ride upon the raised portions of cams 87 and 88 thereby closing the lower contacts of the reversing switches 85 and 86. This connects one side of the source 84 directly to the motor through lead 109. The other side of the source is connected through limit switch 78 and reversing switch 86 to the motor. The motor is energized in this manner to rotate the pin gear 65, causing pin 64 to enter the slot 63 of the slot gear 62 and move the pentaprism 4 to its other position. As has been pointed out pentaprism 4 is locked in its other position as the pin 64 leaves the slot 63 as shown in Fig. 2. Fig. 2 also shows the action of the cam 76 in opening the switch 81 as the pin leaves the slot 63 after rotating the prism through 90°. Opening of the limit switch 78 opens the power circuit thereby deenergizing the motor 71.

The cams 76 and 77 are so designed that one of them is always closed. With the pentaprism arranged to complete the optical path between the lower periscope 2 and the eye piece 3, the reversing switches 85 and 86 are closed to their lower contacts, the limit switch 78 is open and the limit switch 79 is closed. If vibrations of the plane carrying the sighting instrument should cause the pin gear 65 to move in a manner tending to unlock the Geneva mechanism, the cam 76 will also move and the limit switch 78 becomes closed thereby energizing the motor 71 and driving the pin gear 65 in the opposite direction to maintain the Geneva mechanism locked.

When the pentaprism 4 is in the position shown in Fig. 2 the elevation movements of prisms 7 and 7' in tracking an object through the zero elevation position cause cams 87 and 88 to rotate until the followers 102 and 103 close the upper contacts of the switches 85 and 86. As this occurs, the motor will be energized in a manner to rotate the pin gear so that it will drive the slot gear and pentaprism through 90°, to the position shown in Fig. 3, at which time the cam 77 will open limit switch 79.

In order to prevent the pin gear from continuing its rotation until the pin 64 contacts the surface of the slot gear 62, a stop 115 is arranged to engage a pin 116 on the gear 73 at the completion of each cycle of the Geneva mechanism in shifting the pentaprism 4 between its two positions.

If the handwheel 26 were directly connected to the shaft 89 it would be extremely difficult to track an object that happened to be in the horizontal plane of the aircraft because slight deviations of the object above and below the horizontal plane would cause continual shifting of the reversing switches 85 and 86 as the observer endeavored to hold the sight on the object by adjusting the position of handwheel 26. The purpose of the loose coupling 96 is to avoid this condition by providing overlapping fields of view for the prisms 7 and 7'.

In cases where sighting instruments such as that described here are installed in aircraft, the upper and lower hemispheres covered by the respective periscopes meet in the horizontal plane of the aircraft. In view of the shape of the aircraft it is usually possible for the upper and lower periscopes to cover a field of view slightly greater than a hemisphere to provide an overlapping area of a few degrees through which both periscopes are operable.

The loose coupling 96 is designed to permit the particular periscope that is tracking an object, to follow the object into the overlapping portion of the hemisphere that is normally covered by the other periscope. Assuming the upper periscope is tracking an object that moves through the zero elevation plane, the pentaprism is not shifted until the object has moved a few degrees below the zero elevation plane. Then the pentaprism is shifted by the Geneva mechanism to complete the optical path to the lower periscope. This position of the pentaprism is maintained until the lower periscope follows an object through the zero elevation plane into the upper hemisphere.

Since the movements of handwheel 26 are not transmitted directly to the shaft 89 but are connected through loose coupling 96, the handwheel may again drive the optics of the lower periscope through zero elevation position before the cams 87 and 88 operate the reversing switches 85 and 86 to shift the pentaprism to its upper position.

Although the sighting instrument herein described has only two sighting members associated with a single eye piece, it is within the purview of the invention to arrange a similar shifting mechanism for an optical deflecting member adapted to the optical path from an eye piece to any number of sighting members. Similarly, the mechanism may be used to complete the optical path from a plurality of eye pieces to a single sighting member without departing from the invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a sighting instrument having an eye piece and a plurality of sighting members, a selector mechanism for positioning a light deflecting member adapted to complete the optical path between said eye piece and a selected one of said sighting members comprising, a shaft for shifting said light deflecting member, a Geneva mechanism for rotating said shaft to selectively position said light deflecting member, a motor for driving the Geneva mechanism, and cam means rotatable with the Geneva mechanism effective to stop the motor when the light deflecting member is positioned.

2. In a sighting instrument having an eye piece and a plurality of sighting members, a light deflecting member, a selector mechanism for positioning said light deflecting member so as to complete the optical path between said eye piece and a selected one of said sighting members, said selector mechanism comprising a shaft for shifting said light deflecting member, a slot gear on said shaft, a pin gear coacting with said slot gear for positively shifting said light deflecting member to a predetermined position, a motor for driving said pin gear, cam means secured to the pin gear, contact means operable by the cam means, and operating circuits for the motor controlled by the contact means, said cam means being effective to operate the contact means to stop the motor when the light deflecting member reaches a position completing the optical path between the selected one of the sighting members and the eyepiece.

3. A sighting instrument comprising an eye piece, a plurality of sighting members having separate fields of view, tracking means comprising a mechanism coupled with said sighting members for causing said sighting members to follow movements of objects in their respective fields of view, a light deflecting member adapted to be selectively positioned to complete the optical path between any one of the sighting members and said eye piece, a mechanism for positively shifting said light deflecting member to any one of a plurality of predetermined positions, driving means for the last-mentioned mechanism, and a device actuated by said tracking means in predetermined positions of said sighting members for operating said driving means to effect a shift in the position of said light deflecting member.

4. A sighting instrument comprising an eye piece, a plurality of sighting members having separate fields of view, tracking means comprising a mechanism coupled with said sighting members for causing said sighting members to follow movements of objects in their respective fields of view, a light deflecting member adapted to be selectively positioned to complete the optical path between any one of the sighting members and said eye piece, a mechanism for positively shifting said light deflecting member to any one of a plurality of predetermined positions, driving means for the last-mentioned mechanism, a device actuated by said tracking means in predetermined positions of said sighting members for operating said driving means to effect a shift in the position of said light deflecting member, and a device actuated by the latter mechanism in response to predetermined movements of said light deflecting members for rendering said driving means inoperative.

5. A sighting instrument comprising an eye piece, a plurality of sighting members having separate fields of view, tracking means comprising a mechanism coupled with said sighting members for causing said sights to follow movements of objects in their respective fields of view, a light deflecting member adapted to be selectively positioned to complete the optical path between any one of the said sighting members and said eye piece, a mechanism for positively shifting said light deflecting member to any one of a plurality of pretermined positions, driving means for the last-mentioned mechanism, a device responsive to the actuation of said tracking means in a tracking operation for controlling the direction of the last-mentioned driving means, and another device actuated by the latter mechanism in response to movements of said light deflecting member for rendering said driving means inoperative.

6. A sighting instrument comprising an eye piece, a plurality of sighting members having separate fields of view, tracking means comprising a mechanism coupled with said sighting members for causing said sighting members to follow movements of objects in their respective fields of view, a light deflecting member adapted to be shifted to complete according to its position the optical path between said eye piece and a predetermined one of said sighting members, a mechanism for positively shifting said light deflecting member to a predetermined position, driving means for the last-mentioned mechanism, and a device loosely coupled to said tracking means for energizing said driving means in response to predetermined movements of said sighting members.

7. A sighting instrument comprising an eye piece, a pair of oppositely disposed sighting members having separate fields of view, tracking means coupled with said sighting members for causing said sighting members to follow movements of objects in their respective fields of view, a light deflecting member adapted to be shifted to either of two predetermined positions for selectively completing when in either position, the optical path between a predetermined one of said sighting members and said eye piece, a mechanism for positively shifting said light deflecting member between said two positions, and means actuated by said tracking means for operating said mechanism in response to predetermined movements of said sighting members.

8. A sighting instrument comprising an eye piece, a pair of oppositely arranged sighting members having separate fields of view, tracking means coupled with said sighting members for causing them to follow movements of objects in their respective fields of view, a light deflecting member adapted to be shifted to either of two predetermined positions for selectively completing when so positioned the optical path between a predetermined one of said sighting members and said eye piece, a mechanism for positively shifting said light deflecting member from one position to the other, driving means for said mechanism, and a device actuated by said tracking means in response to movements of said sighting members for controlling said driving means.

9. A sighting instrument comprising an eye piece, a pair of oppositely arranged sighting members having separate fields of view, tracking means coupled with said sighting members for causing them to follow movements of objects in their respective fields of view, a light deflecting member adapted to be shifted to either of two predetermined positions for selectively completing when positioned the optical path between a predetermined one of said sighting members and said eye piece, a mechanism for positively shifting said light deflecting member to either of said two positions, driving means for said mechanism, and a device loosely coupled to said tracking means for controlling said driving means in response to overlapping movements of said sighting members.

10. A sighting instrument comprising an eye piece, a pair of oppositely arranged sighting members having separate fields of view, tracking means coupled with said sighting members for causing said sighting members to follow movements of objects in their respective fields of view, a light deflecting member adapted to be shifted to either of two predetermined positions for selectively completing when so positioned the optical path between a predetermined one of said sighting members and said eye piece, a mechanism for positively shifting said member from one position to the other, driving means responsive to the movement of said tracking means during a tracking operation for actuating said mechanism in response to predetermined movements of said sighting members, and a device actuated by said mechanism responsive to the positioning of said light deflecting member for rendering said driving means inoperative.

BENJAMIN L. LEEDS.